United States Patent
Hoggatt et al.

(10) Patent No.: US 6,697,797 B1
(45) Date of Patent: Feb. 24, 2004

(54) METHOD AND APPARATUS FOR TRACKING DATA IN A DATABASE, EMPLOYING LAST-KNOWN LOCATION REGISTERS

(75) Inventors: Dana L. Hoggatt, West Lafayette, IN (US); Kim M. Logan, Lafayette, IN (US); Joseph E. Greer, Jr., Lafayette, IN (US); Edmund R. Harfmann, Lafayette, IN (US); Kevin J. Durflinger, Lafayette, IN (US)

(73) Assignee: Micro Data Base Systems, Inc., West Lafayette, IN (US)

( * ) Notice: Subject to any disclaimer, the term of this patent is extended or adjusted under 35 U.S.C. 154(b) by 0 days.

(21) Appl. No.: 09/561,240

(22) Filed: Apr. 28, 2000

(51) Int. Cl.$^7$ ............................................. G06F 17/30
(52) U.S. Cl. ......................... 707/3; 707/2; 707/103 R
(58) Field of Search ............................. 707/1–10, 102, 707/103, 104.1

(56) References Cited

U.S. PATENT DOCUMENTS

| | | | | |
|---|---|---|---|---|
| 5,008,786 A | * | 4/1991 | Thatte | 711/162 |
| 5,369,778 A | * | 11/1994 | San Soucie et al. | 707/103 R |
| 5,394,534 A | * | 2/1995 | Kulakowski et al. | 711/112 |
| 5,490,258 A | * | 2/1996 | Fenner | 707/1 |
| 5,611,076 A | * | 3/1997 | Durflinger et al. | 707/102 |
| 5,710,920 A | | 1/1998 | Maruyama et al. | |
| 5,713,014 A | * | 1/1998 | Durflinger et al. | 707/4 |
| 5,724,575 A | * | 3/1998 | Hoover et al. | 707/10 |
| 5,819,282 A | | 10/1998 | Hooper et al. | |
| 5,870,763 A | | 2/1999 | Lomet | |
| 5,893,097 A | | 4/1999 | Hayata et al. | |
| 5,909,683 A | | 6/1999 | Miginiac et al. | |
| 5,920,869 A | | 7/1999 | Wakayama et al. | |
| 6,003,040 A | * | 12/1999 | Mital et al. | 707/103 R |
| 6,016,497 A | | 1/2000 | Suver | |
| 6,047,284 A | * | 4/2000 | Owens et al. | 707/4 |
| 6,085,198 A | * | 7/2000 | Skinner et al. | 707/103 R |
| 6,148,391 A | * | 11/2000 | Petrick | 711/109 |
| 6,192,370 B1 | * | 2/2001 | Primsch | 707/103 R |
| 6,535,869 B1 | * | 3/2003 | Housel, III | 707/2 |

FOREIGN PATENT DOCUMENTS

EP 0 923 030 A1 6/1999

OTHER PUBLICATIONS

Object Data Management Group (ODMG 2.0) Book Extract, Rick Cattell, Mar. 1997.

* cited by examiner

Primary Examiner—Shahid Alam
Assistant Examiner—Anh Ly
(74) Attorney, Agent, or Firm—Woodard, Emhardt, Moriarty, McNett & Henry LLP

(57) ABSTRACT

In accordance with the present invention, a data tracking scheme for a database is provided which employs a "last-known location" register as a part of a data block's ID. In certain object-oriented databases embodying the present invention, for example, when an object is created, it is assigned a physical address, which is then included as an extension of the OID, and which is recorded in a logical address register. When the object is moved, rather than identifying every reference to the object within the database, only the physical address in the logical address register is updated. When a reference to the object is encountered during the operation of the database, the last-known-location extension of the OID is consulted for a valid last-known location, that is, a valid physical address. If such a valid last-known location exists, that physical location is accessed in order to retrieve the object. If the last-known-location extension of the OID contains an invalid last-known location, or if the physical address indicated contains something other than the desired object, the logical address register is accessed and the correct physical address is found. At this point, the reference to the object may (but need not) update the last-known address extension of the OID of the target object.

2 Claims, 4 Drawing Sheets

METHOD AND APPARATUS FOR TRACKING DATA IN A DATABASE, EMPLOYING LAST-KNOWN LOCATION REGISTERS

BACKGROUND OF THE INVENTION

The present invention relates generally to databases, and more particularly to address registers used by databases to control access to data contained within a database.

Databases typically belong to one of two major classes: object-oriented and relational. In an object-oriented database, an object typically consists of a unique object identifier (OID), coupled with a variable-sized block of bytes. In relational databases, data is typically stored in blocks of fixed sizes. Regardless of the type of database, it is a critical function of the database to keep track of the physical location in the storage medium of all data in the database. Both relational and object-oriented databases employ data block IDs to identify the blocks of data to be tracked. Databases generally track the physical location of data using one of two schemes: logical address registers (logical ID maps) and physical addresses.

Logical address registers use tuples to provide a one-to-one mapping between a logical address of a block of data and the physical address of that data. The database "refers" to the block of data by it's logical name, or "logical ID", which is used to look up the physical address of that block of data in the logical address register.

Because the use of logical address registers must be persistent across database "opens" and "closes," using such a register requires two accesses of the storage media. This is because retaining the logical address register in volatile memory makes the database much less robust, and because in order to avoid serious limitations on the number of data blocks a database can track, the logical address register must be permitted to grow larger than what can be stored in the volatile memory of typical hardware systems.

Accessing the storage media is one of the bottleneck functions of a database, especially on distributed databases. Logical operations, and accessing of data stored in volatile storage occur much more rapidly than accessing of data stored in stable storage media, such as on a hard drive.

Physical addresses as part of data blocks' IDs are therefore necessary for high-performance databases, in order to reduce the number of times the storage media must be accessed when a data block is referenced. Databases which use the physical address scheme for tracking data blocks use IDs which contain the actual physical address of the respective blocks (rather than the logical address), so that each reference to the block inherently contains the information necessary to physically locate the block on the storage media. In this way, the database can access the data block with only a single access of the storage media.

However, it is also necessary that a database be able to relocate blocks of data from one physical location on the storage media to another. For example, in object-oriented databases, the size of an object may outgrow the physical space available at its present location on the storage media. Also, a database's performance can be enhanced by strategic relocation of data blocks. For example, data blocks which are related to each other are preferably located together on the storage media so that they can be accessed as a group. Since each reference to a block of data within the database must be identified and the ID of the data must be amended to reflect the new location of the data block concurrently with the relocation of the data block, the nature of tracking physical addresses by including the physical address as part of the data block's ID makes movement of data blocks from one location on the storage media to another time consuming, and expensive in terms of consumption of hardware resources Thus, there is a need for a database which employs a data tracking scheme which does not always require two accesses of the storage media in order to access a block of data, but which is able to relocate data blocks within the storage media more easily than is possible for databases relying on physical addresses as a part of the data block IDs.

SUMMARY OF THE INVENTION

In accordance with the present invention, a data tracking scheme for a database is provided which employs a "last-known location" register as a part of a data block's ID. In certain object-oriented databases embodying the present invention, for example, when an object is created, it is assigned a physical address, which is then included as an extension of the OID, and which is recorded in a logical address register. When the object is moved, rather than identifying every reference to the object within the database, only the physical address in the logical address register is updated. When a reference to the object is encountered during the operation of the database, the last-known-location extension of the OID is consulted for a valid last-known location, that is, a valid physical address. If such a valid last-known location exists, that physical location is accessed in order to retrieve the object. If the last-known-location extension of the OID contains an invalid last-known location, or if the physical address indicated contains something other than the desired object, the logical address register is accessed and the correct physical address is found. At this point, the reference to the object may (but need not) update the last-known address extension of the OID of the target object.

In another form of the invention, the database embodying to the present invention is a relational database. When a record in certain relational databases employing the data tracking scheme of the present invention includes a foreign key, for example, the record also includes a "hidden field"— that is, a field accessible only by the database engine— containing any last-known physical address of the record identified by the foreign key. When the database needs to access a record identified by a foreign key, the database attempts to locate the desired record without referring to the index of records containing the needed record by looking for a physical address in the hidden field, and, if it finds one, the database looks for the needed record at that address. If the hidden field does not contain a valid physical address, or if the physical address it contains is inaccurate, the database locates the needed record through the appropriate index, and the physical address in the hidden field can be updated.

One object of the present invention is to provide a database capable of accessing data blocks in fewer than two accesses of the storage media, which is also capable of tracking the relocation of a data block by amending the physical address in only a single reference to the relocated data block. Other objects and advantages of the present invention will be apparent from the following description.

DESCRIPTION OF THE PREFERRED EMBODIMENT

Figure 1:
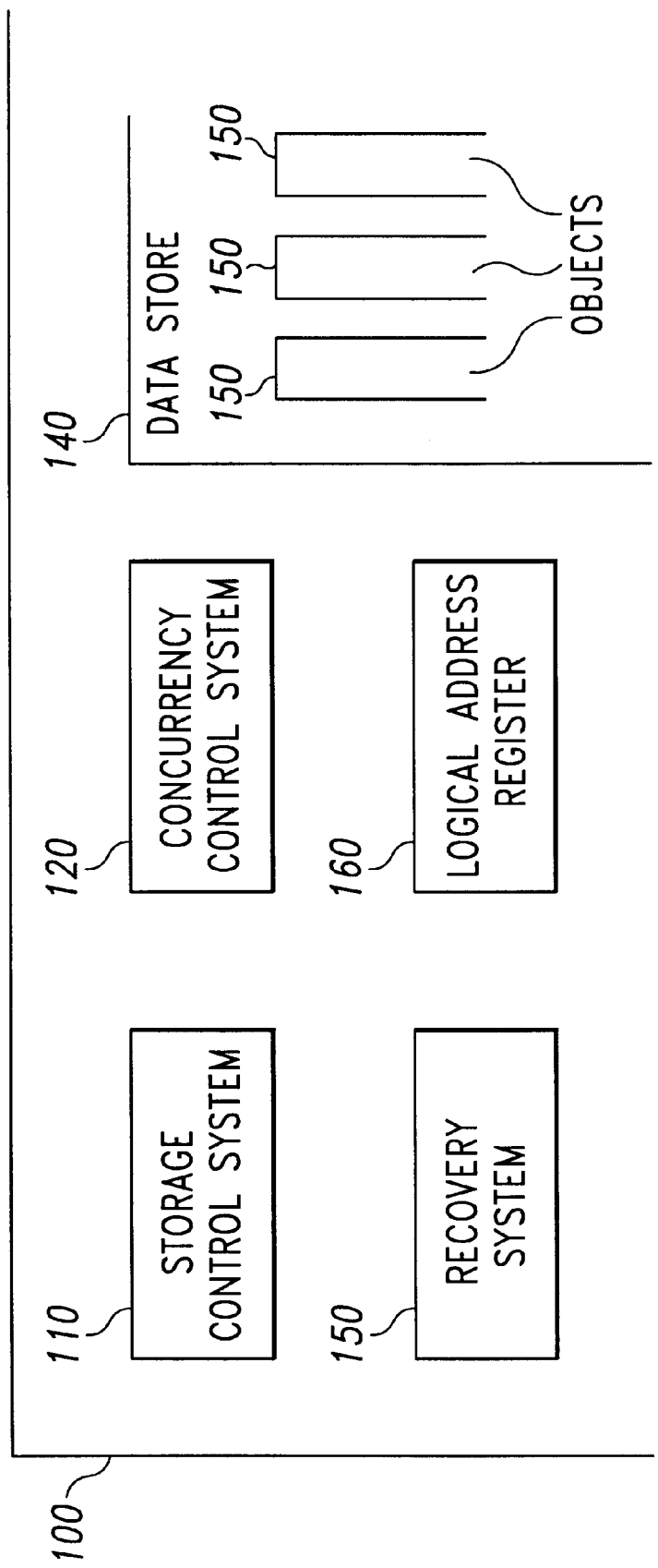
FIG. 1 is a block diagram of certain elements of an object-oriented database embodying a preferred embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described processes, systems, or devices, and any further applications of the principles of the invention as described herein are contemplated as would normally occur to one skilled in the art to which the invention relates.

FIG. 1 is a block diagram of certain elements of a preferred embodiment object-oriented database 100 embodying the present invention. Database 100 comprises a storage control system 110, a concurrency control system 120, a recovery system 130, a data store 140 comprising a plurality of objects 150, and a logical address register 160. The storage control system 110 controls the storage media, including selecting physical locations for the objects 150. The concurrency control system 120 tracks references to the objects 150, and ensures that the correct version of an object 150, which may be changing as a result of references to it, is provided in response to each reference to that object 150. The recovery system 130 protects the database 100 from failures by providing redundant storage of data and tracking references to the objects 150 to ensure that the correct version is returned to the data store 140 following a failure. The logical address register 160 contains a map between the logical name of each object 150 in the database 100 and the physical address of the data comprising that object.

Figure 2:
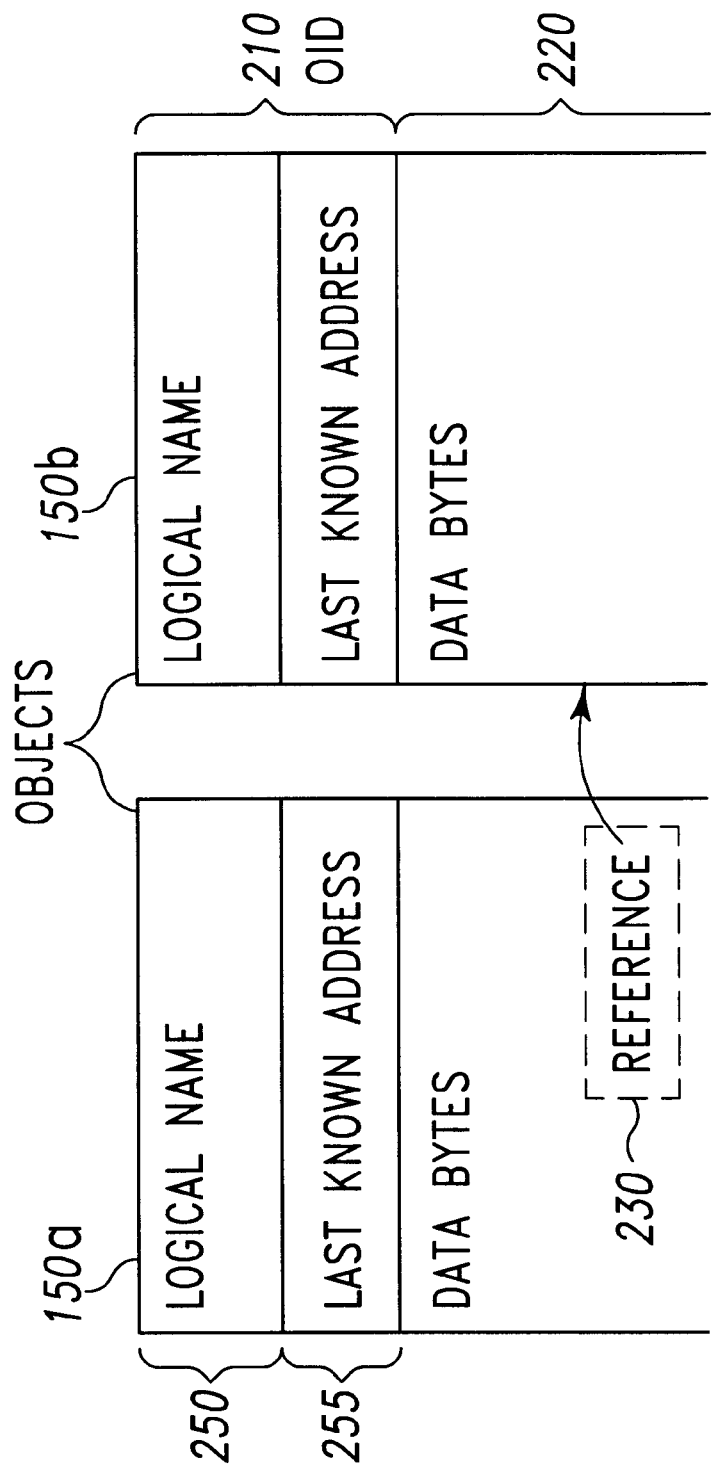
FIG. 2 is a block diagram of a calling object and a target object of the database of FIG. 1.

FIG. 2 shows the preferred embodiment structure of objects 150 in the object-oriented database of FIG. 1. Objects 150 comprise an object ID (OID) 210, and a variable-sized block of bytes 220. The OID 210 further comprises a logical name 250 and a last-known-address register 255, which is a place-holder set of bytes sufficient to hold a physical address for the object 150. The preferred embodiment OID 210 of objects 150 are sometimes called extended object IDs (XOID), to distinguish them from OIDs which lack a last-known address register 255.

The variable-sized block of bytes 220 can include one or more references 230 to other objects 150. When, during database processing, an object 150 refers to another object 150 through a reference 230, the object containing the reference 230 is called the "calling object" 150a, and the object identified in the reference 230 is called the "target object" 150b. A reference 230 to a target object 150b comprises a copy of the OID 210 of the target object 150b, in order to identify the desired target object 150b. Thus, a database will often include numerous copies of a given OID 210; one copy comprises the header for the object 150 itself, where it is stored on the storage media (shown as 310 in FIG. 3), while the others comprise a portion of the data bytes of other objects 150 which might need to call it during database processing.

In certain embodiments, the OID 210 of an object 150 which serves as its header can exclude the last-known-address register 255 in order to reduce the size of the object 150. This is because the database 100 must already know where the object 150 is, at any point where the database 100 is reading the object 150. In certain other embodiments, every copy of the OID 210 of an object 150 includes the last-known-address register 255.

Figure 3:
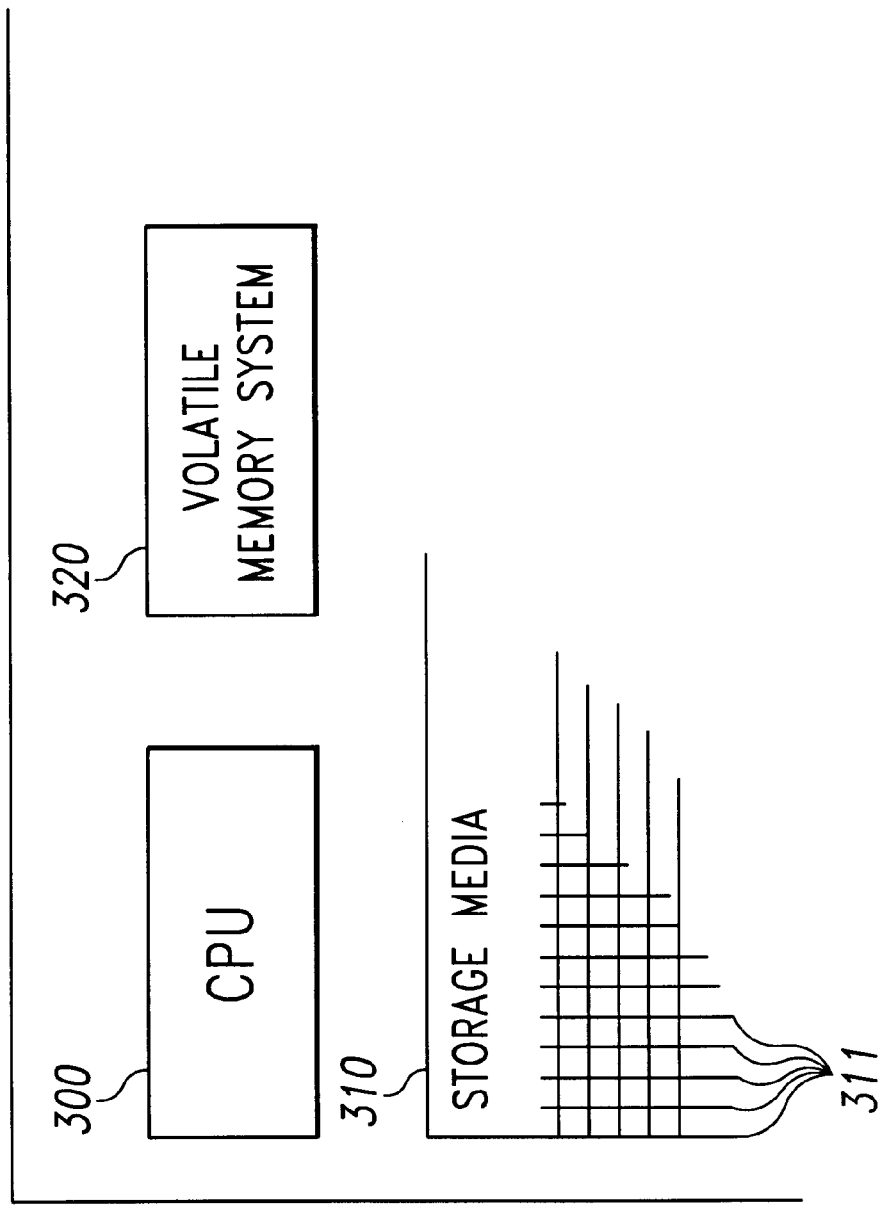
FIG. 3 is a block diagram of the preferred embodiment hardware on which the database of FIG. 1 resides.

FIG. 3 is a block diagram of certain elements of the preferred embodiment hardware on which the database 100 resides. In order to function, the database 100 requires a central processor unit (CPU) 300, and storage media 310. Volatile memory system 320 is not technically necessary, but is normally required for useful performance speeds, and typically comprises random-access memory (RAM). In certain embodiments, storage media 310 is a single hard disk, such as is commonly known in the art. In another embodiment, storage media 310 is a floppy disk. In still other embodiments, other stable storage media, such as magnetic tape, are used. In certain other embodiments, storage media 310 is a set of storage devices, which may be located at a single work-station, or at a number of work-stations linked to a single network. In these last embodiments, the database is an example of a distributed database. Because the storage media 310 is preferably a hard or floppy disk, or set of disks, the process of accessing the storage media 310 is sometimes called a disk access.

Storage media 310 is divided into a plurality of physical addresses 311, indicating both a physical location on the storage device, and, in the case of distributed databases, the specific storage device which contains the physical location. Typically, addresses 311 are ordered both according to a strict logical order, such as a numerical assignment, and according to their position on the storage media 310. In this way, a block of data, which typically occupies more than a single address, is stored over a physically contiguous set of addresses 311 when it is assigned a set of logically contiguous addresses. In this situation, although the block of data actually occupies a plurality of addresses 311, it can be said to be located at the first physical address 311, as determined by the strict logical order. In some situations, a block of data requiring a plurality of physical addresses 311 can be stored in non-contiguous physical addresses. Even in these situations, the data block can be said to be located at the first physical address 311 containing a portion of the data block. The location of the physically separated portion of a data block can be tracked as if it were a separate data block, or simply with a physical address contained within another portion of the data block, as is known in the art.

Each time database 100 creates an object 150, it is assigned a unique logical name 250. The storage control system 110 selects a physical address 311 at which to store the object 150, adds the logical name 250 of the object to the logical address register 160, and writes the physical address 311 in the logical address register 160 to create the logical map between the logical name 250 and the physical address 311. The storage control system 110 also writes the object 150 on the storage media 310, starting at the physical address 311 selected.

Each object 150 may be the target object 150b of a plurality of other objects 150. Such references are not necessarily restricted to a logical tree—that is, sets of objects 150 may form closed loops of calling and target objects 150b, so that, for example, a first object 150 can contain a reference 230 to a second object 150, the second object 150 can contain a reference 230 to a third object 150, and the third object 150 can contain a reference 230 to the first object 150. Each reference 230, contained in a calling object 150a, comprises a separate instance of the OID 210 of the target object 150b, each of which is like all the other references 230 in other calling objects 150a (or, potentially, in the same calling object 150a), in that it contains the same logical name 250 of the target object 150b. Each OID 210 contained within a reference 230 is also like each of the others in that it contains a last-known-address register 255, although the specific data stored in the last-known-address register may vary between OIDs 210, even though the OIDs 210 refer to the same target object 150b and contain the same logical name of that target object 150b. Each instance of an OID 210, however, is unique, in that it is a part of a different calling object 150a (or is a different part of one of the same calling objects 150a), and is stored on a different set of physical locations on the storage media 310. In other words, if the instances of an OID 210 were thought of as independent blocks of data, they would have different physical addresses 311, and could vary between instances at least by what data was contained within the last-known-address register 255.

Subsequently, each time an object 150 is moved from one physical address 311 to another, the storage control system concurrently amends the logical address register 160 to cause the map between the logical name of the object 150 to indicate the correct new physical address 311. In certain embodiments, the database 100 evaluates current demands on database resources to determine whether, additionally, to update the physical address 311 stored in one or more OIDs 210 which reference the object 150. In other embodiments, the last-known locations stored in the last-known location registers 255 are simply permitted to become out-of-date.

Because not every physical address 311 stored in an OID 210 referring to a target object 150b is necessarily updated when the target object 150b is moved, the address registers are permitted to map to physical addresses 311 according to a one-to-plurality function. That is, given a single initial value corresponding to a given target object 150b, the function of finding a physical address 311 by looking in an address register (either within a reference 230 referring to that target object 150b or in the logical address register 160) may return different values corresponding to a physical address 311, depending on which particular address register was referred to. This is tolerable to database operation, because the logical address register 160 is maintained as a definitive address register.

Likewise, because after a first target object 150b has been moved, the storage control system 110 may assign a second target object 150b to the physical address vacated by moving the first target object 150b, the address registers are permitted to map to physical addresses 311 according to a plurality-to-one function. That is, the function of finding a physical address 311 by looking in an address register referring to a target object 150b may return the same value corresponding to the same physical address 311, even when the function is performed for a plurality of different initial values corresponding to a plurality of different target objects 150b.

Figure 4:
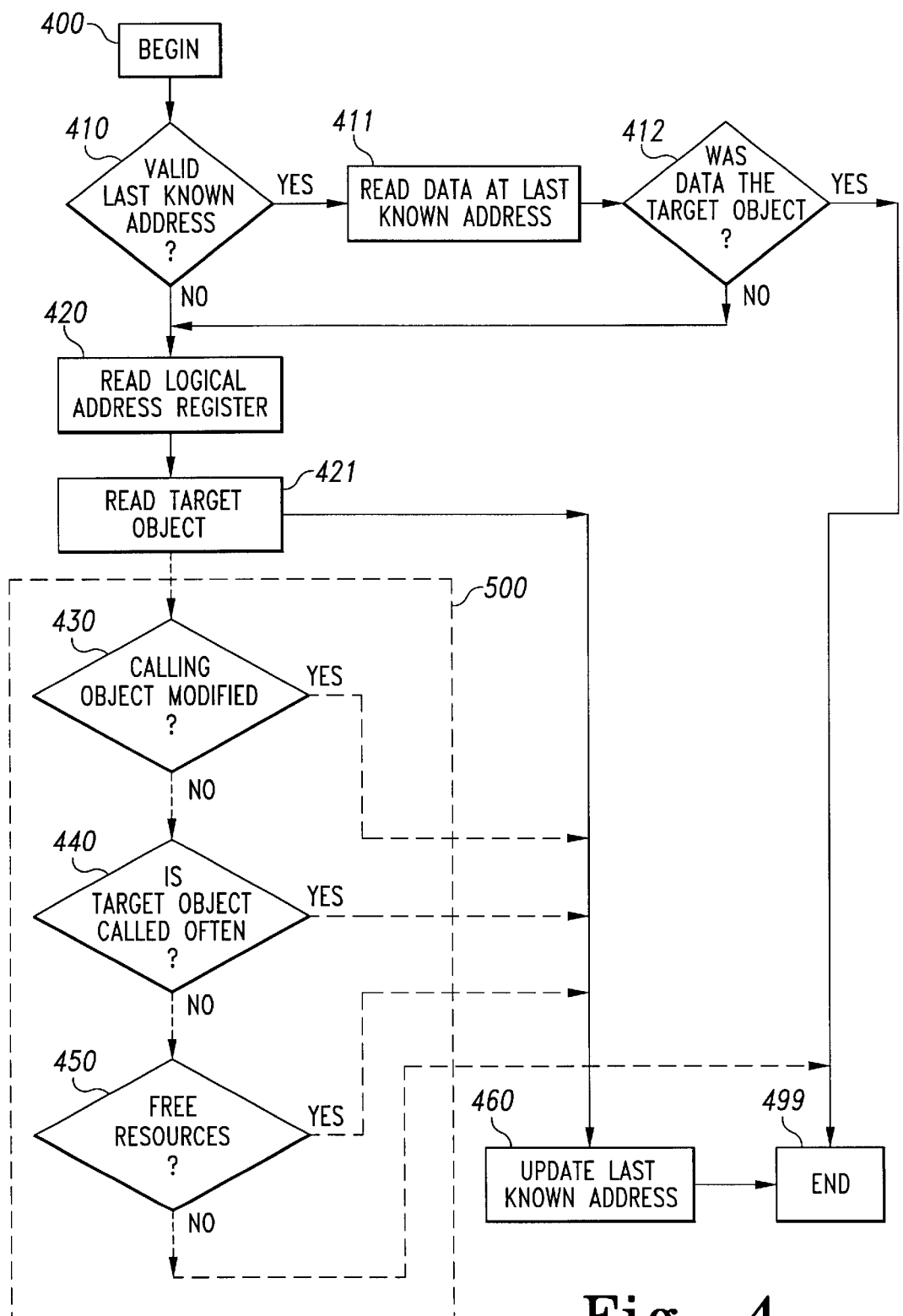
FIG. 4 is a flowchart showing the preferred embodiment logic used by the database of FIG. 1 to locate target objects within the database.

Referring now to FIG. 4, the logical process by which an object-oriented database 100 according to the present invention tracks the physical location of objects 150 is shown. The process begins at step 400 when, during database processing, a calling object 150a refers to a target object 150b. At step 410, the database 100 examines the last-known-location register 255 of the OID 210 comprising the reference 230 to the target object 150b within the calling object 150a to determine if it contains a valid last-known location, in the form of a physical address 311. If such a valid last-known location is found in the last-known-location register 255, the data at the indicated physical address 311 is read in step 411, and then, in step 412, the data read from that physical address 311 is examined to determine if it is, in fact, the desired target object 150b, for example, by comparing the logical name from the OID 210 of the object read with that in the reference 230 which called for the target object 150b. If the desired target object 150b has been found the process ends at step 499.

If, at step 410, the last-known-location register 255 is found not to contain a valid last-known address, or, if, at step 412, the last-known location is found to contain the wrong data, at step 420 the storage control system 120 refers to the logical address register 160 to find the map from the logical name 250 of the target object 150b to the correct physical address 311. At step 421 the storage control system 120 then reads the target object 150b from the physical address 311 found in the logical address register 160. In the preferred embodiment, the database 100 then updates the last-known address of the target object 150b in the reference 230.

Section 500 of FIG. 4 illustrates portions of the object-tracking process of certain alternative embodiments of the data-tracking process of the present invention. After finding the correct physical address 311 of the target object 150b at step 421, the database optionally examines whether the calling object 150a is being updated for any reason at step 430. In certain embodiments, even if the calling object 150a is not scheduled for update, at step 440 the database examines present demand on database resources to determine whether there are sufficient unused resources to update the last-known-address register 250 of the calling object 150a without taking away from other database functions. Preferably, even if the calling object 150a is not scheduled for update, and even if the database would have to take away from other database functions to perform the update of the last-known address, at step 450 the database examines the frequency with which the target object 150b is referenced to determine if it is likely to be more efficient to modify the last-known address register 250. If the database determines that the calling object 150a is to be updated, or if sufficient unused resources are available, or if the database determines that expending scarce resources is likely to be more efficient, in step 460 the last-known-address register 250 is scheduled for update to reflect the more recent last-known address. It is contemplated that the database 100 can make any or all of these determinations, or any combination of them, to determine when to update a last-known address 255 which is found to be invalid or inaccurate.

It will be familiar to those skilled in the art that disk accesses are amongst the most costly operations in terms of resources in database functioning. Therefore, a data tracking scheme which reduces the total number of disk accesses necessary to locate an object is capable of substantially improved performance. Most object-oriented databases which rely on a logical address register for tracking data require two disk accesses to locate a target object 150b. An object-oriented database embodying the present invention requires a variable number of disk accesses to locate a target object 150b; in practice, the average number of disk accesses is believed to be less than two.

When an object 150 refers to a target object 150b, and the OID 210 has an accurate last-known address in the last-known-address register 255, the database 100 will find the target object 150b with a single disk access. The first time an OID 210 is used to refer to an object, the last-known address register 255 will contain no valid last-known address, and the database 100 will find the target object 150b with two disk accesses. When the OID 210 has an inaccurate last-known address, because the database 100 has moved the target object 150*b* since the last time the calling object 150*a* referred to it with the same reference 230, the database 100 will require three disk accesses to locate the target object 150*b*. The average number of disk accesses required to locate a target object 150*b* is therefore given by:

$$D = 2P_O + P_A + 3P_I \quad (1)$$

$$P_O + P_A + P_I = 1 \quad (2)$$

D=the expectation value for the number of disk accesses required $P_O$=the probability of finding an invalid last-known address $P_A$=the probability of finding an accurate last-known address $P_I$=the probability of finding an inaccurate last-known address The relative frequency with which these three cases will occur can be generally anticipated. Objects 150 typically need to be relocated only infrequently, relative to the number of times to which they are referred. Therefore, the probability of finding an inaccurate last-known address is substantially less than the probability of finding an accurate one. The expectation value of the number of disk accesses required to locate a target object 150*b* is therefore typically less than two. Furthermore, because a reference 230 generally will be used to refer to a target object 150*b* multiple times during the life of the object, the probability of finding an invalid last-known address is typically quite small, depending primarily on what logic the database uses to decide whether to update the last-known address when it finds one to be invalid or inaccurate. Therefore, the average number of disk accesses needed to locate a target object 150*b* is expected to be substantially less than 2, and can actually approximate 1. Thus, an object-oriented database 100 embodying the present invention will typically track data blocks substantially more efficiently than an object-oriented database relying on a logical address register.

On those occasions when the database 100 does relocate an object 150, the process is substantially less costly than in databases which rely on the physical addresses to track objects, because only the physical address 311 stored in the logical address register 160 needs to be updated immediately. Eventually, most of the remaining references 230, which would be immediately updated in such a physical-address dependent database, will be updated in a database 100 employing last-known addresses. These operations will, however, be deferred, allowing them to be performed at more efficient times during database processing. Also, the updates will sometimes be performed when the calling object 150*a* is itself being updated, as a result of the reference to the target object 150*b*. Thus, two updates can be performed as a single operation, thus reducing the total number of disk accesses by one. Even in the worst-case scenario, each update of a last-known address is no more demand on resources than would have been required by a database relying on physical addresses. Therefore, an object-oriented database 100 embodying the present invention will be able to relocate data blocks substantially more efficiently than one relying on physical addresses.

While the invention has been illustrated and described in detail in the drawings and foregoing description, the same is to be considered as illustrative and not restrictive in character, it being understood that only the preferred embodiment, and certain alternative embodiments deemed helpful in further illuminating the preferred embodiment, have been shown and described and that all changes and modifications that come within the spirit of the invention are desired to be protected.

What is claimed is:

1. A method of locating a target object, comprising:
   a) providing a database comprising:
      a logical address register; and
      an OID comprising a last-known-physical-address register;
   b) examining the last-known-physical-address register to determine if it contains a last-known physical address that is valid;
   c) if the last-known-physical-address register was determined at step (b) to contain a valid last-known physical address, reading data located at the physical address listed in the last-known-physical-address register, and then determining whether the data is the target object;
   d) if data read in step (c) is determined to be the target object, terminating the method; and
   e) if the last-known-physical-address register was not determined at step (b) to contain a valid last-known physical address, and if data read in step (c) is not determined to be the target object, reading from the logical address register to find the correct physical address of the target object, then reading the target object from the correct physical address, then updating the last-known-physical-address register with the correct physical address.

2. A method of locating target objects, comprising:
   a) providing a database comprising:
      a logical address register; and
      OIDs comprising a last-known-physical-address register;
   b) examining the last-known-physical-address register to determine if it contains a last-known physical address that is valid;
   c) if the last-known-physical-address register was determined in step (b) to contain a valid last-known physical address, reading data located at the physical address listed in the last-known address register, and then determining whether the data is the target object;
   d) if data read in step (c) is determined to be the target object, terminating the method;
   e) if the last-known-physical-address register was not determined at step (b) to contain a valid last-known physical address, and if data read in step (c) is not determined to be the target object, reading from the logical address register to find the correct physical address of the target object, then reading the target object from the correct physical address;
   f) determining whether the calling object is scheduled to be updated;
   g) determining whether the target object is called more frequently than a predetermined frequency;
   h) determining whether the database currently has excess resources available with which to update the last-known-physical-address register; and
   i) if the determinations of at least one of (f), (g), and (h) were positive, updating the last-known-physical-address register with the correct physical address.

* * * * *